Patented June 13, 1944

2,351,248

UNITED STATES PATENT OFFICE 2,351,248

PRODUCTION OF HYDROCARBONS

Gustav Wirth, Franz Sabel, and Hans Laudenklos, Leuna, Germany; vested in the Alien Property Custodian No Drawing. Application April 20, 1940, Serial No. 330,730. In Germany November 25, 1938

4 Claims. (Cl. 260—449.6)

The present invention relates to the production of hydrocarbons with more than one carbon atom in the molecule by conversion of carbon monoxide with hydrogen.

This conversion is carried into effect by passing the initial gases over a catalyst at elevated temperatures and it has hitherto been the general practice to continue the treatment until the initial gases are converted as completely as possible into hydrocarbons. The most complete conversion of the initial gases was believed to be obtained when working with an amount of initial gas of about 100 cubic meters per cubic meter of catalyst per hour, while maintaining temperatures between 150 and 350° C. and operating in the presence of catalysts containing cobalt, nickel or iron or several such metals, if desired, together with additional catalytic materials, such as for example thorium oxide and magnesium oxide, and carriers, such as for example diatomaceous earth, pumice stone and silica gel.

In order to increase the yield of hydrocarbons with more than one carbon atom in the molecule (that is the amount of these products per cubic meter of carbon monoxide and hydrogen) it has already been proposed to work in two or more conversion stages arranged in series and to completely or partially remove the hydrocarbons formed from the reaction products after each stage.

In this operation an incomplete conversion of the mixture of carbon monoxide and hydrogen into hydrocarbons takes place in the first stage or stages, and only in the last stage the remainder of the carbon monoxide and hydrogen is contingently completely converted, but the specific throughput of the initial gases based on the total amount of catalyst, that is the throughput expressed as volume of initial gas per total volume of catalyst per hour, is not different from the specific throughput used when working in a single stage.

We have now found that when working in stages much higher outputs of the desired hydrocarbons (that is the amount of these products per volume of catalyst and per hour) can be obtained by increasing the throughput of the initial gas in each stage to such an extent that further raising the throughput does not give a substantial further increase in output.

When working under conditions giving the optimum output of hydrocarbons with more than one carbon atom in the molecule generally also the optimum output of liquid products is obtained.

When increasing the throughput of the initial gases in accordance with the present invention in all stages of the process to a multiple of the throughput which was hitherto usual, the yield of the desired products, calculated on the amount of gas introduced, decreases, but the output of these products per hour based on the volume of catalyst increases up to a certain limit. When still further increasing the gas throughput the output of the desired products (likewise based on the volume of catalyst) again slightly decreases.

When working under conditions giving the optimum output small alterations in the throughput employed do not result in a substantial change in the output and therefore even with small variations in the supply of gas, such as may occur in practical operation, a constant output of desired products is obtained. The gas throughput at which the optimum outputs based on the amount of catalyst is obtained, varies with the activity of the catalyst, the temperature, the pressure and the construction of the apparatus. Generally, throughputs of from 200 to 600 cubic meters per cubic meter of catalyst and per hour give the desired results.

When working in several stages with the said high throughputs the amount of catalyst to be used in order to obtain a certain output of desired products can be considerably decreased as compared with the operation in a single stage or in several stages with the throughputs hitherto usual. The liquid hydrocarbons formed in the single stages are preferably separated after each stage from the gases by cooling (for example to about 30° C.). These gases may then be passed, by reason of their smaller volume as compared with the volume of the gases introduced into the preceding conversion stage, through a smaller reaction vessel, and the subsequent vessel may again be smaller, and so on. Each of the vessels can be divided into any desired number of single spaces connected in parallel.

However, it is also possible to pass the hydrocarbons, which have been formed in one of the reaction vessels, wholly or partly together with the gases which have not been converted, into the next reaction vessel.

The increased throughputs to be used in accordance with the invention can also be obtained by recirculating a part of the gases issuing from the reaction vessel or vessels. From the gas to be recycled the hydrocarbons are preferably not removed.

In general the time of contact of the reaction gases in a single reaction space is more than 6 seconds, even when recycling part of the gases.

In the single reaction vessels the throughput can also be increased by an addition of fresh gas before the entry of the main gas stream into the vessel or at one or more points between the entry and exit of the main gas stream. In this case it is not necessary that the second and further reaction vessels are of smaller size but it is then possible to work with vessels of the same size.

The gases need not pass through the second and further reaction vessels with the same throughput as through the first vessel. Smaller throughputs in the subsequent vessels may even be advantageous when the composition of the gases has materially changed. Likewise the other reaction conditions, such as temperature, pressure, catalyst activity, in the subsequent stages need not be the same as or similar to those in the previous stages.

The cooling of the reaction vessels, which is necessary in view of the exothermic reaction is preferably carried out by means of indirect heat exchange with a cooling agent. The usual cooling media such as, for example, water boiling under a suitable pressure or oil may be employed. An additional cooling may be effected by adding to the reacting gases a cold gas, for example, cold hydrogen or cold carbon monoxide or mixtures thereof or a cold inert gas.

The process may be carried out under normal or elevated pressure, for example, a pressure between 10 and 30 atmospheres, or also under high pressures, such as 100 atmospheres or more. The reaction temperatures usually range between 150 and 350° C. and preferably between 160 and 250° C. in case catalysts containing cobalt as active constituent are employed. When working with iron catalysts the temperatures are usually higher. The process is not limited to a certain construction of the conversion vessels. The usual catalysts in particular those comprising cobalt, iron and/or nickel may be employed, for example, those catalysts prepared by precipitation, sintering or melting.

The following examples further illustrate the nature of the present invention and in what manner the same can be carried out in practice but it should be understood that the invention is not limited to the said examples.

*Example 1*

A gas consisting of 28 per cent of carbon monoxide, 57 per cent of hydrogen and 15 per cent of accompanying gases is passed under 10 atmospheres and at 195° C. over a catalyst consisting of 85 parts of cobalt and 15 parts of thorium oxide on 85 parts of diatomaceous earth in an amount of 110 cubic meters per cubic meter of catalyst per hour. Thereby liquid hydrocarbons are formed in an amount of 100 grams per cubic meter of the mixture of carbon monoxide and hydrogen. When the amount of initial gas is increased to 400 cubic meters of gas per cubic meter of catalyst per hour, the yield amounts to 40 grams per cubic meter of the mixture of carbon monoxide and hydrogen.

In the first case 9.35 kilograms of liquid product are obtained per 110 cubic meters of fresh gas or per cubic meter of catalyst, in the second case 13.6 kilograms of liquid products per 400 cubic meters of fresh gas or per cubic meter of catalyst. Therefore in the first case an amount of 45 per cent more of the catalyst is necessary for obtaining the same output.

In the second case the gas freed from the liquid products has a volume amounting to 79 per cent of that of the fresh gas. It is passed with a throughput of 400 cubic meters per cubic meter of catalyst and per hour through a second reaction vessel, the catalyst space of which amounts to only 79 per cent of the catalyst space of the first vessel. In this manner a further amount of 12.6 kilograms of liquid products is formed per cubic meter of catalyst.

The gas leaving the second vessel has a volume of only 64 per cent of that of the fresh gas, it is passed, after removal of the liquid constituents, with the same throughout per cubic meter of catalyst through a third reaction vessel, the catalyst space of which amounts to 64 per cent of that of space of the first vessel. Hereby a further amount of 11.4 kilograms of liquid product is formed per cubic meter of catalyst.

The gas issuing from the third vessel has a volume of 53 per cent of that of the fresh gas; it is passed, after removal of the liquid constituents, with the same throughput per cubic meter of catalyst through a fourth reaction vessel, the catalyst space of which amounts to 53 per cent catalyst space of the first vessel. Hereby a further amount of 10.1 kilograms of liquid products is formed per cubic meter of catalyst.

In the four vessels containing 2.96 cubic meters of catalyst, there are obtained 36.22 kilograms of liquid products per hour which is equivalent of a yield of 12.2 kilograms per cubic meter of catalyst and per hour (that is 30.5 per cent more of liquid products than in the first case). For the production of the same quantity of hydrocarbons as in the first case the catalyst space required in the second case can be by 23 per cent smaller than in the first case.

In both case the heat generated in the conversion is removed by cooling the reaction vessels by heat exchange with a cooling liquid.

*Example 2*

A gas containing 28 per cent of carbon monoxide and 57 per cent of hydrogen is passed at a temperature of 195° C. and with a throughput of 300 cubic meters per cubic meter of catalyst and per hour through a space of 1.18 cubic meters filled with a catalyst consisting of 46 per cent of cobalt, 8 per cent of magnesium oxide and 46 per cent of diatomaceous earth, and, after separation of the liquid constituents formed by this treatment, through a second vessel of 1 cubic meter of internal space which is filled with the same catalyst. The throughput in the second vessel is only 261.5 cubic meters of gas per cubic meter of catalyst space as compared with 300 cubic meters in the first vessel. The total yield is 10.6 kilograms of liquid products. By addition of fresh gas before the second reaction vessel in an amount of 15 per cent of the gas freed from the liquid constituents coming from the first vessel the optimum throughput of 300 cubic meters per cubic meter of catalyst space and per hour is also obtained in this second reaction vessel and thereby the total yield is increased by 0.6 kilogram.

In both cases the surplus heat evolved in the conversion is removed by cooling the conversion vessels by heat exchange with a cooling liquid.

What we claim is:

1. In a process for the production of hydrocarbons having more than one carbon atom in the molecule by the catalytic conversion of carbon monoxide with hydrogen in a plurality of consecutive reaction vessels with removal behind each reaction vessel of the liquid hydrocarbons formed, the improvement of maintaining in all reaction vessels substantially the same throughput within the range from 200 to 600 cubic meters of gas per cubic meter of catalyst per hour.

2. In a process for the production of hydrocarbons having more than one carbon atom in the molecule by the catalytic conversion of carbon monoxide with hydrogen in a plurality of consecutive reaction vessels with removal behind each reaction vessel of the liquid hydrocarbons formed, the improvement of maintaining in all the reaction vessels substantially the same throughput of gas per cubic meter of catalyst per hour by using reaction vessels of decreasing capacity, the decrease in capacity being substantially proportional to the decrease in volume of the gas supplied to each vessel.

3. In a process for the production of hydrocarbons having more than one carbon atom in the molecule by the catalytic conversion of carbon monoxide with hydrogen in a plurality of consecutive reaction vessels with removal behind each reaction vessel of the liquid hydrocarbons formed, the improvement of maintaining in all the reaction vessels substantially the same throughput within the range from 200 to 600 cubic meters of gas per cubic meter of catalyst per hour by using reaction vessels of decreasing capacity, the decrease in capacity being substantially proportional to the decrease in volume of the gas supplied to each vessel.

4. In a process for the production of hydrocarbons having more than one carbon atom in the molecule by the catalytic conversion of carbon monoxide with hydrogen in a plurality of consecutive reaction vessels with removal behind each reaction vessel of the liquid hydrocarbons formed, the improvement of maintaining in all the reaction vessels substantially the same throughput within the range from 200 to 600 cubic meters of gas per cubic meter of catalyst per hour by adding to the gas passing into the second and subsequent vessels fresh gas in an amount substantially equal to the difference in volume of gas between that passing into the first vessel and that due to the contraction in volume by the reaction and by the removal of the produced liquid hydrocarbons from the reaction mixture leaving each vessel.

GUSTAV WIRTH.
FRANZ SABEL.
HANS LAUDENKLOS.